(12) United States Patent
Ivanov

(10) Patent No.: US 8,138,735 B2
(45) Date of Patent: Mar. 20, 2012

(54) LOW-VOLTAGE START UP CIRCUIT AND METHOD FOR DC-DC BOOST CONVERTER

(75) Inventor: Vadim V. Ivanov, Tucson, AZ (US)

(73) Assignee: Texas Instruments Incorporated, Dallas, TX (US)

(*) Notice: Subject to any disclaimer, the term of this patent is extended or adjusted under 35 U.S.C. 154(b) by 284 days.

(21) Appl. No.: 12/653,004

(22) Filed: Dec. 7, 2009

(65) Prior Publication Data

US 2011/0134665 A1 Jun. 9, 2011

(51) Int. Cl.
*G05F 1/575* (2006.01)
*G05F 1/613* (2006.01)

(52) U.S. Cl. ........................ 323/284; 323/901
(58) Field of Classification Search .................. 323/222, 323/223, 282, 284, 285, 351, 901

See application file for complete search history.

(56) References Cited

U.S. PATENT DOCUMENTS

| 4,347,474 A * | 8/1982 | Brooks et al. ................. 323/224 |
| 4,542,330 A * | 9/1985 | Terbrack ....................... 323/222 |
| 5,625,279 A * | 4/1997 | Rice et al. ..................... 323/283 |
| 6,967,471 B2 * | 11/2005 | Paulos .......................... 323/282 |
| 7,081,739 B2 | 7/2006 | Osinga et al. ................. 323/222 |
| 7,227,344 B2 * | 6/2007 | Kogel et al. ................... 323/288 |

* cited by examiner

*Primary Examiner* — Gary L Laxton
(74) *Attorney, Agent, or Firm* — William B. Kempler; Wade J. Brady, III; Frederick J. Telecky, Jr.

(57) ABSTRACT

A start up circuit (4-1) for a boost circuit (10) includes an adjustable-duty-cycle oscillator (1-2) that turns on a switch transistor ($M_{SW}$) connected to an inductor (L) receiving an input voltage ($V_{IN}$). If a voltage ($V_9$) of a junction between the transistor and the inductor exceeds a predetermined value corresponding to a maximum inductor current ($I_L$), an amplifier (A1) immediately terminates a first phase of an oscillator cycle, which turns off the transistor. Built-up inductor current is steered into a load. Duty-cycle-adjustment circuitry (R1, R2,C1) causes the oscillator to complete a normal second phase of the cycle before a new cycle begins.

20 Claims, 6 Drawing Sheets

LOW-VOLTAGE START UP CIRCUIT AND METHOD FOR DC-DC BOOST CONVERTER

BACKGROUND OF THE INVENTION

The present invention relates generally to improving the operability of energy harvesting devices, and more particularly to low voltage start up circuitry for a boost converter in an inductive energy harvesting system.

Engineers have attempted to design "ultra low" power integrated circuits, for example integrated circuits that require extremely low amounts of operating current and which can be operated without being plugged into conventional AC power systems. Instead, it is desirable that such ultra-low-power integrated circuits be powered by small amounts of power "scavenged" or "harvested" from ambient solar, vibrational, thermal, and/or biological energy sources by means of micro-energy "harvesting devices" and stored in batteries or super-capacitors.

Prior Art FIG. 1 shows a conventional ring oscillator 1-1. Ring oscillator 1-1 has an oscillation frequency determined by the values of resistor R0 and capacitors C0 and C1. For a CMOS implementation, the duty cycle of ring oscillator 1-1 is 0.5, i.e., 50%, if the threshold of inverter I1 is midway between the upper supply voltage (typically $V_{DD}$) and the lower supply voltage (typically ground).

Prior Art FIG. 2 shows a ring oscillator 1-2 which is a modified version of ring oscillator 1-1 of Prior Art FIG. 1. In oscillator 1-2, the output of inverter I2 is connected by conductor 13 to one plate of capacitor C0, the gate of a P-channel transistor M0, and the gate of a N-channel transistor M1. The other plate of capacitor C0 is connected by conductor 15 to the input of inverter I1 and one plate of capacitor C1, the other plate of which is connected to ground. The output of inverter I1 is connected to the input of inverter I2. The drain of transistor M0 is connected by resistor R1 to conductor 15, and the source of transistor M0 is connected to $V_{DD}$. The drain of transistor M1 is connected to conductor 15 by resistor R2, and the source of transistor M1 is connected to ground.

Thus, in FIG. 2 the resistance is separated into two separate resistors R1 and R2 connected in series between transistors M0 and M1. The total resistance should be equal to R1+R2=2×R0 for oscillator 1-2 of FIG. 2 to have the same oscillation frequency as oscillator 1-1 of FIG. 1. In this case, the frequency of oscillator 1-2 of FIG. 2 is the same that of oscillator 1-1 1 of FIG. 1 but the duty cycle is determined by the resistor ratio R0/R1), and therefore can be set to any desired value.

During start-up operation in an energy harvester, the supply voltage $V_{DD}$ supplied to the oscillator of a start-up circuit for a DC-DC boost converter (which converts a DC output or a rectified output of the energy harvester to a battery charging voltage) is very low, approximately 0.4 volts. Consequently, none of the circuitry in the boost converter is operable during the start-up operation. Setting the duty cycle of the oscillator in FIG. 2, when it is used in a start-up circuit for the DC-DC boost converter, by setting a ratio of resistors R1 and R2 in FIG. 2 is not adequate if the input voltage has different values and varies over a wide range, e.g. from 0.4 volts V to 2.0 volts. This is because the duty cycle preferably is equal to the ratio of input and output voltages of the boost converter, and therefore the duty cycle should be adjusted as the output voltage of the boost converter rises during charging of the load capacitance. The duty cycle also should be adjusted as the boost converter input voltage varies when its output voltage remains stable.

A DC-DC boost converter should be able to start up in response to an input voltage $V_{IN}$ as low as 0.4 volts in the absence of a charged-up battery or any other energy harvester power source. For example, the minimum workable value of input voltage $V_{IN}$ of a DC-DC boost converter needs to be approximately 0.4 to 0.5 volts in order to boost the output of a single solar cell harvester. However, until the output voltage of an energy harvesting device applied to provide the input voltage of a boost converter reaches a value of approximately 1.3 to 1.5 volts, none of the usual control circuitry inside the boost converter is operable. As a practical matter, meaningful feedback can not be produced by the boost converter to control the duty cycle of its switch transistor until the output voltage of the boost converter is greater than approximately 1.6 to 1.8 volts.

The closest prior art is believed to also include U.S. Pat. No. 7,081,739 entitled "Voltage Converting Circuit Having Parallel-Connected Switching Devices" issued Jul. 25, 2006 to Osinga et al. During start-up the power switch of the disclosed boost converter is toggled on and off without feedback, and is controlled only by a low-voltage start up oscillator. The duty cycle of the oscillator is chosen for the worst-case combination of low input voltage from a solar collector, low inductor value, and load resistance in order to provide sufficient current to cause the output voltage to rise to a value at which normal feedback operation of the converter can start. However, that choice of duty cycle leads to over-designing of the power switch and too much consumption of current through the inductor of the boost converter during start up operation in most modes of operation.

It should be noted that even short-term overloading of the inductor of a boost converter may cause failure of the inductor, especially when the inductor is implemented as a low-cost monolithic inductor.

Thus, there is an unmet need for a low-cost, low complexity, low power start up circuit and method for use in conjunction with a boost converter which has a very low input voltage, especially for use in energy harvesting applications.

There also is an unmet need for a low-cost, low complexity, extremely low power start up circuit and method for use in conjunction with a boost converter having a very low input voltage and which avoids damage caused by excessive current in the inductor and/or power switch transistor of the boost converter.

There also is an unmet need for a way to avoid over-design of the power switch in a DC-DC boost converter, especially in energy harvesting applications.

There also is an unmet need for a start up circuit technique which is capable of starting up a DC-DC boost converter from an input voltage that is substantially lower in magnitude than the lowest value of input voltage at which internal circuitry of the boost circuit is operable.

SUMMARY OF THE INVENTION

It is an object of the invention to provide a low-cost, low complexity, low power start up circuit and method for use in conjunction with a boost converter having a very low input voltage, especially for use in energy harvesting applications.

It is another object of the invention to provide a low-cost, low complexity, extremely low power start up circuit and method for use in conjunction with a boost converter which has a very low input voltage and which avoids damage caused by excessive current in the inductor and/or power switch transistor of the boost converter.

It is another object of the invention to provide a way to avoid over-design of the power switch in a DC-DC boost converter, especially in energy harvesting applications.

It is another object of the invention to provide a start up circuit technique which is capable of starting up a DC-DC boost converter from an input voltage that is substantially lower in magnitude than the lowest value of input voltage at which internal circuitry of the boost circuit is operable.

It is another object of the invention to provide a power-efficient and fast start up circuit and method for a DC-DC boost converter receiving a very low input voltage.

Briefly described, and in accordance with one embodiment, the present invention provides a start up circuit (4-1) for a boost circuit (10) which includes an adjustable-duty-cycle oscillator (1-2) that turns on a switch transistor ($M_{SW}$) connected to an inductor (L) receiving an input voltage ($V_{IN}$). If a voltage ($V_9$) of a junction between the transistor and the inductor exceeds a predetermined value corresponding to a maximum inductor current ($I_L$), an amplifier (A1) immediately terminates a first phase of an oscillator cycle, which turns off the transistor. Built-up inductor current is steered into a load. Duty-cycle-adjustment circuitry (R1,R2,C1) causes the oscillator to complete a normal second phase of the cycle before a new cycle begins.

In one embodiment, the invention provides a start up circuit (4-1) for assisting start up of an inductive boost circuit (10) that includes a switch transistor ($M_{SW}$) having a drain coupled to an inductor (L) as an input voltage ($V_{IN}$) coupled to the inductor (L) rises to a predetermined input voltage level, the boost circuit (10) generating a first voltage ($V_9$) indicative of a current ($I_L$) flowing in the inductor (L). The start up circuit (4-1) includes oscillator circuitry (1-2,3) that includes delay circuitry (16,21,17) having an input coupled to a first conductor (15) and an output coupled to a second conductor (13). The second conductor (13) is coupled to a first terminal of a first capacitor (C0), a second terminal of the first capacitor (C0) is coupled by the second conductor (15) to a first terminal of a first resistor (R1), a first terminal of a second resistor (R2), and a first terminal of a second capacitor (C1). The first resistor (R1) has a second terminal coupled to a drain of a first transistor (M0) and the second resistor (R2) has a second terminal coupled to a drain of a second transistor (M1). The first transistor (M0) has a source coupled to a first supply voltage ($V_{DD}$) and a gate coupled to the first terminal of the first capacitor (C0). Values of the first (R1) and second (R2) resistors and values of the first (C0) and second (C1) capacitors determine a duty cycle of the oscillator circuitry (1-2,3). The second transistor (M1) has a source coupled to a second supply voltage (GND) and a gate coupled to the gate of the first transistor (M0). Amplifier circuitry (A1) has a first input (−) coupled to receive the first voltage ($V_9$) and also has an output coupled to turn off the switch transistor ($M_{SW}$) if the first voltage ($V_9$) exceeds a predetermined level to prevent the inductor current ($I_L$) from exceeding a predetermined inductor current level.

In the described embodiments, a gate driver circuit (5,5A) has an input coupled to the second conductor (13) and an output (19) coupled to a gate of the switch transistor ($M_{SW}$). The gates of the first (M0) and second (M1) transistors are directly coupled to the second conductor (13) and the first terminal of the first capacitor (C0). In one embodiment, the delay circuitry (1-2,3) includes a first inverter (16) having an input coupled to the first conductor (15) and an output coupled to an input of a second inverter (17) having an output coupled to the second conductor (13).

In one embodiment, the output of the amplifier circuitry (A1) is coupled to the first conductor (15) by means of a third transistor (M3) having a gate coupled to the output of the amplifier circuitry (A1), a drain coupled to the first conductor (15), and a source coupled to the first supply voltage ($V_{DD}$) by means of a fourth transistor (M2) having a gate coupled to the second conductor (13).

In one embodiment, the output of the amplifier circuitry (A1) is directly coupled to the first conductor (15). The amplifier circuitry (A1) has a second input (+) coupled to receive a reference voltage ($V_{REF}$) equal to the predetermined level of the first voltage ($V_9$).

In one embodiment, the gates of the first (M0) and second (M1) transistors are coupled to the second conductor (13) by means of an inverting circuit (MP17,MN26) including a third transistor (MP17) having a gate coupled to the second conductor (13), a source coupled to the first supply voltage ($V_{DD}$) and a drain coupled by a third conductor (28) to the gates of the first (M0) and second (M1) transistors and a drain of a fourth transistor (MN26) having a gate coupled to the second conductor (13) and a source coupled to the second supply voltage (GND).

In one embodiment, the delay circuitry (16,21,17) includes a first inverter (16) having an input coupled to the first conductor (15) and an output coupled to an input of a second inverter (21) having an output coupled to an input of a third inverter (17) having an output coupled to the second conductor (13). The amplifier circuitry (A1) includes a fifth transistor (M4) having a source coupled to receive the first voltage ($V_9$), a gate and drain coupled to receive a bias current (23) from the first supply voltage ($V_{DD}$) and a gate of a sixth transistor (M3). The sixth transistor (M3) has a source coupled to the second supply voltage (GND) and a drain coupled to the first conductor (15), wherein channel-width-to-channel-length ratios of the fifth (M4) and sixth (M3) transistors are mismatched to in effect provide a threshold voltage equal to the predetermined level of the first voltage ($V_9$) at which the switch transistor ($M_{SW}$) is to be turned off. The start up circuit includes a seventh transistor (MN7) having a source coupled to the second supply voltage (GND), a drain coupled to the gates of the fifth (M4) and sixth (M3) transistors, and a gate connected to the output (29) of the first inverter (16) to disable the amplifier circuitry (A1) while the switch transistor ($M_{SW}$) is off.

In a described embodiment, the boost circuit (10) includes a diode (D) having an anode coupled to the drain of the switch transistor ($M_{SW}$) and a cathode coupled to an output (11) of the boost converter (10), for steering the current ($I_L$) in the inductor (l) through an output conductor (11) of the boost converter (10). In one embodiment, the input voltage ($V_{IN}$) comes from a rectifier circuit of a low voltage energy harvesting system.

In one embodiment, the invention provides a method for assisting start up of an inductive boost circuit (10) including a switch transistor ($M_{SW}$) having a drain coupled to a first terminal of an inductor (L) having a second terminal coupled to receive an input voltage ($V_{IN}$). The method includes turning on the switch transistor ($M_{SW}$) in response to a first phase of a cycle of oscillator circuitry (1-2,3) having an adjustable duty cycle, to cause a build-up of the inductor current ($I_L$); coupling a drain voltage ($V_9$) of the switch transistor ($M_{SW}$) to a first input of amplifier circuitry (A1) to cause a first change in an output of the amplifier circuitry (A1) if the drain voltage ($V_9$) exceeds a predetermined value corresponding to a maximum desired build-up of the inductor current ($I_L$); immediately turning off the switch transistor ($M_{SW}$) in response to the first change in the output of amplifier circuitry (A1) by immediately terminating the first phase of the oscillator circuitry (1-2,3); steering the built-up inductor current ($I_L$) into a load;

and operating the oscillator circuitry (1-2,3) to complete a normal second phase of the cycle immediately after the terminating of the first phase.

In one embodiment, the method includes turning the switch transistor ($M_{SW}$) on during a first phase of a cycle of duty-cycle-adjustable oscillator circuitry (1-2,3) which includes delay circuitry (16,17) having an input coupled to a first conductor (15) and an output coupled to a second conductor (13), the second conductor 13 being coupled to a first terminal of a first capacitor (C0), a second terminal of the first capacitor (C0) being coupled by the second conductor (15) to a first terminal of a first resistor (R1), a first terminal of a second resistor (R2), and a first terminal of a second capacitor (C1), the first resistor (R1) having a second terminal coupled to a drain of a first transistor (M0), the second resistor (R2) having a second terminal coupled to a drain of a second transistor (M1), the first transistor (M0) having a source coupled to a first supply voltage ($V_{DD}$) and a gate coupled to the first terminal of the first capacitor (C0), values of the first (R1) and second (R2) resistors and values of the first (C0) and second (C1) capacitors being determinative of a duty cycle of the duty-cycle-adjustable oscillator circuitry (1-2,3), the second transistor (M1) having a source coupled to a second supply voltage (GND) and a gate coupled to the gate of the first transistor (M0). The first (C0) and second (C1) capacitors are charged to a first logic level in response to the first change in the output of the amplifier circuitry (A1), wherein the switch transistor ($M_{SW}$) is turned off in response to the first logic level. Subsequently the first (C0) and second (C1) capacitors are charged to a second logic level through one of the first (R1) and second (R2) resistors, wherein the switch transistor ($M_{SW}$) is turned on in response to the second logic level. An output voltage (13) of the delay circuit (16,17) is applied to an input of a gate driver circuit (5), an output of which turns the switch transistor ($M_{SW}$) on, and an output voltage (13) of the delay circuit (16,17) is applied to an input of the gate driver circuit (5), the output of which turns the switch transistor ($M_{SW}$) off.

In one embodiment, the invention provides a start up circuit (4-1) for assisting start up of an inductive boost circuit (10) including a switch transistor ($M_{SW}$) having a drain coupled to a first terminal of an inductor (L) which has a second terminal coupled to receive an input voltage ($V_{IN}$). The start up circuit (4-1) includes means (1-2) for turning on the switch transistor ($M_{SW}$) in response to a first phase of a cycle of oscillator circuitry (1-2,3) having an adjustable duty cycle, to cause a build-up of the inductor current ($I_L$); means (9,20) for coupling a drain voltage ($V_9$) of the switch transistor ($M_{SW}$) to an input of amplifier circuitry (A1) to cause a first change in an output of the amplifier circuitry (A1) if the drain voltage ($V_9$) exceeds a predetermined value corresponding to a maximum desired build-up of the inductor current ($I_L$); means (1-2,20) for immediately turning off the switch transistor ($M_{SW}$) in response to the first change in the output of amplifier circuitry (A1) by immediately terminating the first phase; means (D) for steering the built-up inductor current ($I_L$) into a load; and means (R1,R2,C1) for operating the oscillator circuitry (1-2, 3) to complete a normal second phase of the cycle immediately after the terminating of the first phase.

DETAILED DESCRIPTION OF THE PREFERRED EMBODIMENTS

Figure 1:
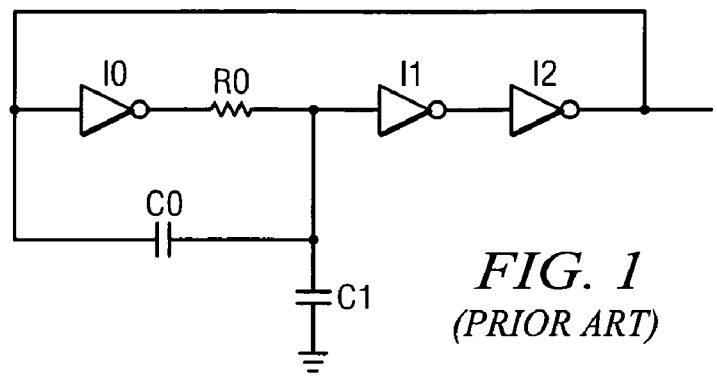
FIG. 1 is a schematic diagram of a conventional ring oscillator.
Figure 2:
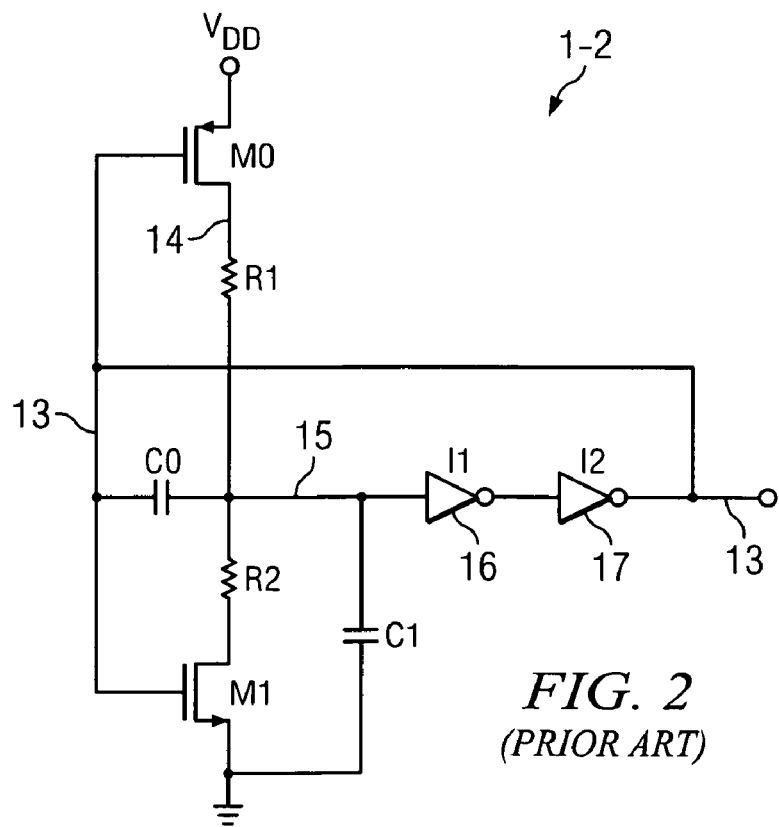
FIG. 2 is a schematic diagram of a known modification of the ring oscillator of FIG. 1.
Figure 3:
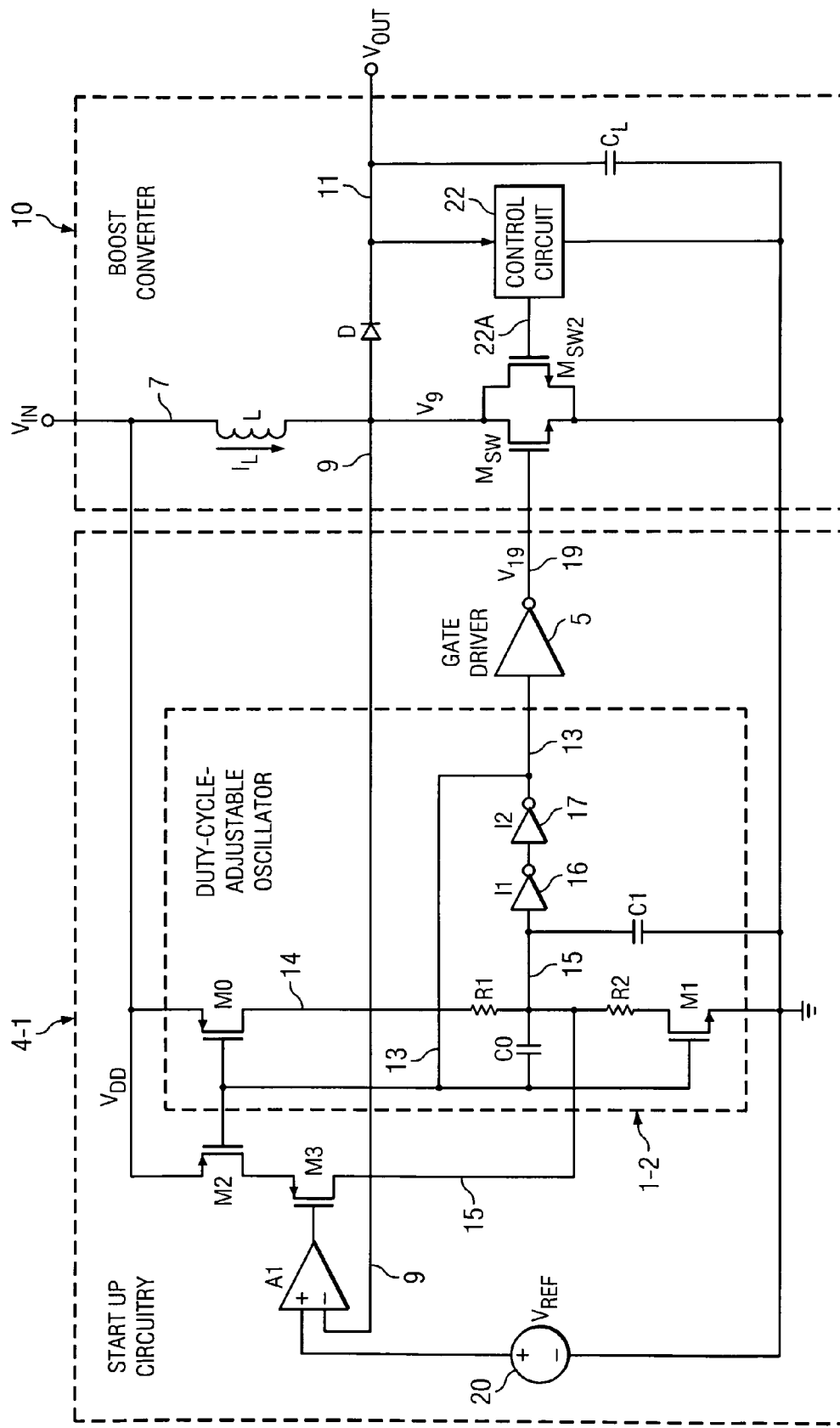
FIG. 3 is a schematic diagram of a low voltage start-up circuit including an oscillator in combination with a gate driver and boost converter.

FIG. 3 shows a circuit 3-1 which includes a start up circuit 4-1 that includes the oscillator 1-2 of Prior Art FIG. 2, a conventional gate driver circuit 5, an amplifier A1, P-channel transistors M2 and M3, and a voltage reference circuit 20. The output 13 of oscillator 1-2 is connected to the input of gate driver circuit 5.

As in FIG. 2, the output 13 of oscillator 1-2 is connected to one plate of capacitor C0, the gate of a P-channel transistor M0, and the gate of a N-channel transistor M1. The other plate of capacitor C0 is connected by conductor 15 to the input of inverter I1 and one plate of capacitor C1, the other plate of which is connected to ground. The output of inverter I1 is connected to the input of inverter I2, the output of which is connected to conductor 13. The drain of transistor M0 is connected by resistor R1 to conductor 15, and the source of transistor M0 is connected to $V_{DD}$. The drain of transistor M1 is connected to conductor 15 by resistor R2, and the source of transistor M1 is connected to ground. The gates of transistors M0 and M1 are connected to conductor 13.

Figure 4:
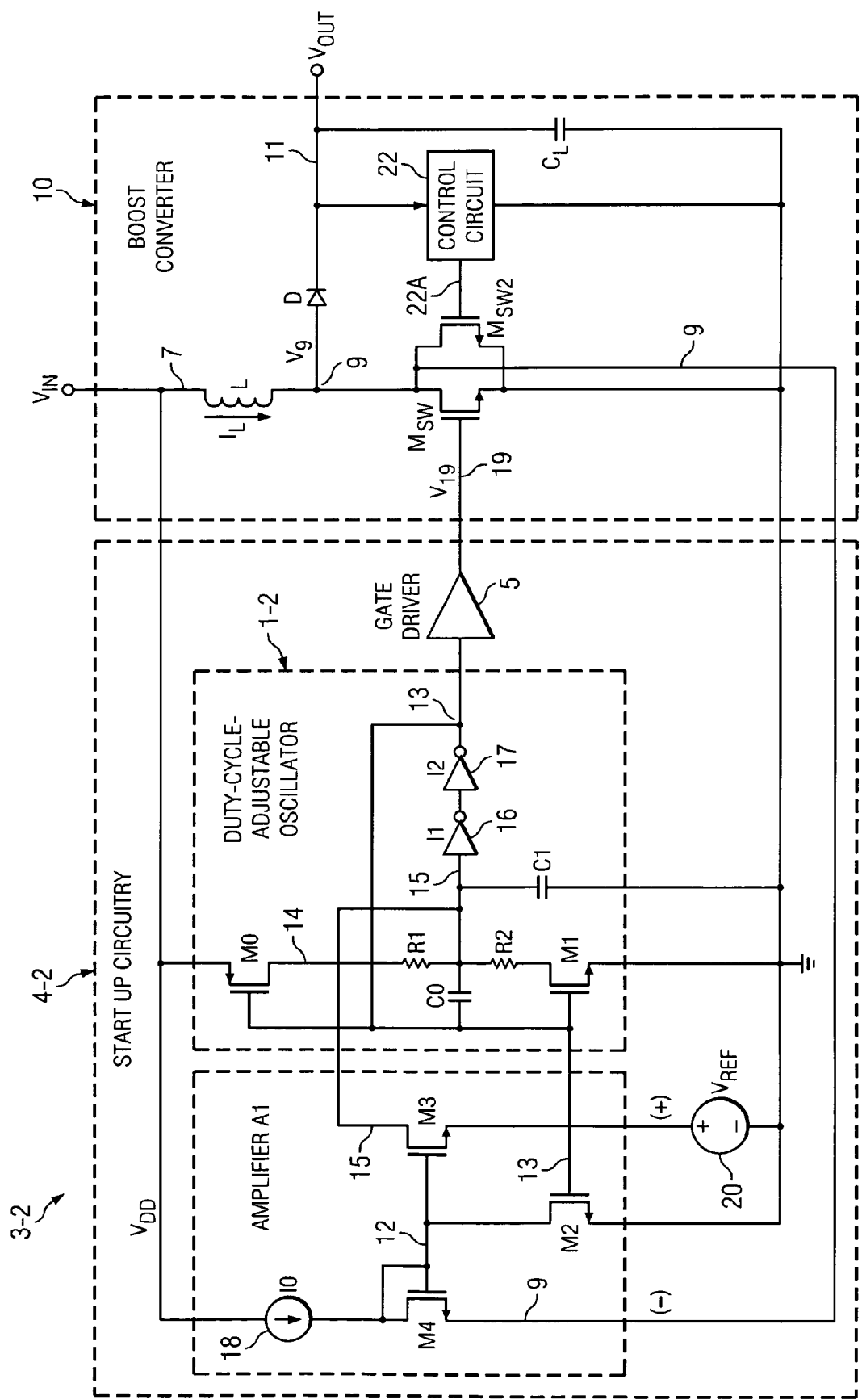
FIG. 4 is a more detailed schematic diagram of the low-voltage start-up oscillator of FIG. 3 in combination with the gate driver and boost converter.
Figure 5:
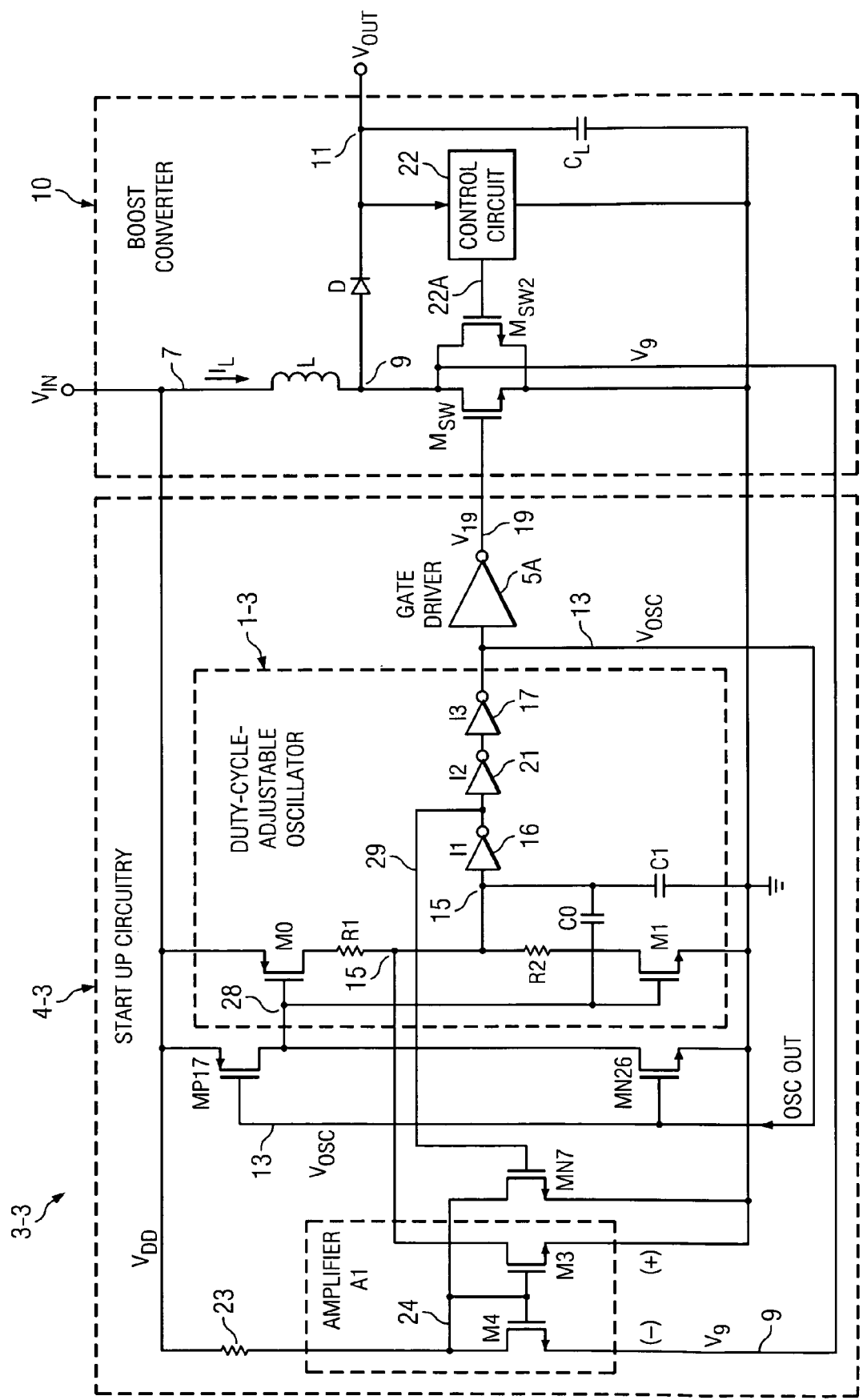
FIG. 5 is a schematic diagram of an implementation of the oscillator of FIG. 4.

The output of gate driver circuit 5 is connected to the gate of a N-channel switch transistor $M_{SW}$ of a DC-DC boost converter circuit 10. Boost converter 10 also includes an inductor L having a lower terminal connected by conductor 9 to the anode of a diode D, the drain of switch transistor $M_{SW}$, and the (−) input of an amplifier A1 included in start up circuit 4-1. The upper terminal of inductor L is connected to receive a DC voltage $V_{IN}$, which could be a DC signal from a solar cell harvester or a rectified output signal produced by a rectifier circuit (not shown) receiving a low frequency, low voltage harvested AC signal from a piezo or induction energy harvester device (not shown). (Note that $V_{DD}$ can be equal to $V_{IN}$, and that is how it is shown in FIGS. 3-5.) The anode of diode D is connected by conductor 11 to one terminal of a load capacitor CL, the other terminal of which is connected to ground, so that a boosted DC output voltage $V_{OUT}$ is generated on conductor 11. (Note that diode D can be implemented by means of a simple active rectifier circuit instead of a single diode, if there is sufficient supply voltage available to operate the comparator of the active rectifier circuit.) Boost converter 10 also includes a conventional control circuit 22 having an input coupled to output conductor 11, and generates a feedback control signal on conductor 22A which is connected to the gate of a separate N-channel switch transistor $M_{SW2}$ coupled between conductor 9 and ground. (Alternatively, the output 22A of control circuit 22 could be coupled to an input of a multiplexer having another input coupled to the output of gate driver 5 and an output coupled to the gate of switch transistor $M_{SW}$.) Note that boost converter 10 is off, i.e., not boosting the output voltage $V_{OUT}$, while the gate of power switch $M_{SW}$ is being controlled by the start up circuitry, and when boost converter 10 is boosting the output voltage $V_{OUT}$, start up circuitry 4-1 does not control gate of power switch $M_{SW}$.

Oscillator output conductor 13 is also connected to the gate of transistor M2, which has source connected to $V_{DD}$ and its drain connected to the source of transistor M3. The gate of transistor M3 is connected to the output of amplifier A1, the (+) input of which is connected to the (+) terminal of a voltage reference circuit 20, the (−) terminal of which is connected to ground, so voltage reference circuit 20 produces a reference voltage $V_{REF}$ on the (+) input of amplifier A1. The drain of transistor M3 is connected by conductor 15 to the junction between resistors R1 and R2 of oscillator 1-2.

The duty cycle of oscillator circuitry 1-2 in FIG. 3 can be adjusted during operation of start up circuit 3 by varying the charging and discharging currents of capacitors C0 and C1.

When the current $I_L$ in inductor L increases, that increases the amount of voltage drop across the channel resistance $R_{ON}$ of power switch transistor $M_{SW}$ and therefore also increases the drain voltage $V_9$ of switch transistor $M_{SW}$. When $V_9$ exceeds $V_{REF}$, amplifier A1 turns transistor M3 on, which pulls the voltage of conductor 15 toward $V_{DD}$. That voltage causes a "1" level to, in effect, propagate through inverters 16 and 17 to the input of gate driver 5, which then turns off switch transistor $M_{SW}$. This decreases the duty cycle during which switch transistor $M_{SW}$ is turned on and therefore limits the amount of current through switch transistor $M_{SW}$, and therefore also limits the maximum level of current $I_L$ in inductor L during start up because of the limited channel resistance $R_{ON}$ of switch transistor $M_{SW}$. This protects inductor L from over-current damage and improves its reliability and also improves the circuit operating speed.

FIG. 4 shows a circuit 3-2 which is another implementation of circuitry 3-1 in FIG. 3. Boost converter 10 in FIG. 4 is the same as shown in FIG. 3. In FIG. 4, amplifier A1 of start up circuit 4-2 includes current source 18 and N-channel transistors M2, M3, and M4. Current source 18 provides a constant current I0 through diode-connected transistor M4, the gate and drain of which are connected by conductor 12 to the gate of transistor M3 and the drain of transistor M2. The source of transistor M3 is connected to the (+) input of amplifier A1 and the (+) terminal of a voltage reference circuit 20 that generates $V_{REF}$. The drain of transistor M3 is connected to conductor 15. The gate of transistor M2 is connected to conductor 13, and its source is connected to ground. The source of diode-connected transistor M4 is connected by conductor 9 to the (−) input of amplifier A1 and the drain of switch transistor $M_{SW}$. The rest of the circuitry in FIG. 4, including oscillator 1-2, is the same as in FIG. 3, except that gate driver circuit 5 is non-inverting. The overall operation of the circuit in FIG. 4 also is essentially the same as the operation of circuit 3-1 of FIG. 3.

FIG. 5 shows a circuit 3-3 which includes a start up circuit 4-3 that is somewhat different than start up circuit 4-2 of FIG. 4. Boost converter 10 as shown in FIG. 5 is the same as in FIGS. 3 and 4. The oscillator circuitry 1-3 in FIG. 5 is quite similar to oscillator circuitry 1-2 in FIGS. 3 and 4, but includes three inverters 16, 21, and 17 connected in series, rather than two inverters as in FIGS. 3 and 4. The input of inverter 16 is connected by conductor 15 to one plate of each of capacitors C0 and C1 and to one terminal of each of resistors R1 and R2. The other plate of capacitor C1 is connected to ground. The other plate of capacitor C0 is connected by conductor 28 to the gate of P-channel transistor M0, the gate of N-channel transistor M1, the drain of a N-channel transistor MN26, and the drain of a P-channel transistor MP17. Transistors MN26 and MP17 together form an inverter that drives the gate of transistors M0 and M1 of oscillator circuitry 1-3. The sources of transistors M1 and MN26 are connected to ground. The drain of transistor M1 is connected to the other terminal of resistor R2. The sources of transistors M0 and MP17 are connected to $V_{DD}$. The drain of transistor M0 is connected by conductor 15 to the other terminal of resistor R1. The sources of transistors M0 and MP17 are connected to $V_{DD}$.

In the example of FIG. 5, there is a total of five series-connected inverting stages in the feedback loop including inverters 16, 21, and 17, the inverter including P-channel transistor MP17 and N-channel transistor NN26, and the inverting stage including P-channel transistor M0 and N-channel transistor M1. This number of inverting stages was chosen to provide sufficient voltage gain to ensure sustainable oscillation. (Low-threshold transistors are used in the inverter including transistors MP17 and MN26, and standard-threshold transistors are used in the other 4 inverting stages in order to reduce the total amount of shoot-through current during circuit operation.) Inverting gate driver 5A produces a gate driver voltage signal $V_{19}$ on the gate of power switch transistor $M_{SW}$.

The output of inverter 17 produces an oscillator output signal $V_{OSC}$ on conductor 13, which is connected to the gates of inverter transistors MP17 and MN26 and also to the input of inverting gate driver circuit 5A.

N-channel transistors M4 and M3 form a common gate amplifier A1 that is analogous to amplifier A1 in FIG. 3. The voltage $V_9$ on the drain of switch transistor $M_{SW}$ in FIG. 5 is applied to the source of diode-connected transistor M4, which has its gate coupled to its drain and to the gate of transistor M3 and the drain of a N-channel transistor MN7. The drain of transistor M4 is coupled by resistor 23 to $V_{DD}$. The source of transistor M4 is the (−) input of amplifier A1. The drain of transistor M3 is coupled to conductor 15, which is connected to the junction between resistors R1 and R2 of oscillator circuitry 1-3. The source of transistor M3 is the (+) input of amplifier A1, and is connected to ground. The source of transistor MN7 is connected to ground and its gate is connected by conductor 29 to the output of inverter 16 and the input of inverter 21. The output of inverter 21 is connected to the input of inverter 17. Transistor MN7 operates to shut down the duty-cycle-controlling circuitry when switch transistor M is to be turned off. That is, transistor MN7 is in its turned on condition when switch transistor $M_{SW}$ is off so its drain voltage $V_9$ is high and inductor current is being steered through diode D.

The function of $V_{REF}$ voltage source 20 in FIGS. 3 and 4 is accomplished in FIG. 5 by providing transistor M4 with a larger channel-width-to-channel-length ratio than for transistor M3, so that amplifier A1 in FIG. 5 has an internal input offset voltage equal to $V_{REF}$.

Start up circuitry 4-3 of FIG. 5 normally operates as indicated in the following example, wherein the duty cycle of oscillator circuitry 1-3 and switch transistor $M_{SW}$ is selected to be 5. This duty cycle means the "on" time of switch transistor $M_{SW}$ is much longer than its "off" time. When switch transistor $M_{SW}$ is turned on, it starts to integrate the inductor current $I_L$ (by causing a build-up of $I_L$ in inductor L, depending on the magnitude of $V_{IN}$). When $I_L$ increases to a particular value determined by the above-mentioned threshold voltage and the "on" resistance $R_{ON}$ of switch transistor $M_{SW}$, start up circuitry 4-3 turns switch transistor $M_{SW}$ off. Specifically, up circuitry 4-3 turns switch transistor $M_{SW}$ off by causing transistor M3 to pull the voltage on conductor 15 toward ground. This transition causes the low or "0" level on conductor 15 to be inverted 3 times by inverters 16, 21, and 17 to produce a "1" level on the input of inverting gate driver 5A. This generates a low "0" level on the gate of switch transistor $M_{SW}$, thereby turning it off. This causes the inductor current $I_L$ to be steered through diode D to the load, which may include a battery being charged. Note that if the input voltage $V_{IN}$ is substantially increased, then inductor current $I_L$ increases much faster, and if the value of inductor current $I_L$ becomes too large, it may exceed the current-carrying capability and reliability limits of switch transistor $M_{SW}$ and/or inductor L.

To prevent this, the present invention reduces the "on" time of switch transistor $M_{SW}$ (and therefore decreases the duty cycle) if the drain voltage $V_9$ of $M_{SW}$ exceeds the above mentioned threshold voltage. After capacitor C2 has been discharged through resistor R2 to the switching threshold of inverter 16, start up circuitry 4-3 starts the next oscillator cycle by turning $M_{SW}$ on again. In this manner, the duty cycle of the oscillator circuitry 1-3 can be, in effect, adjusted "on-the-fly" to a value anywhere between, for example, 10 and 1 as necessary to prevent inductor current $I_L$ becoming too large in response to large values of $V_{IN}$.

To summarize, low input voltage start up of boost converter 10 is accomplished by providing oscillator circuitry 1-3 with a varying duty cycle by varying the gate drive voltage $V_{19}$ in order to adjust the channel resistance $R_{ON}$ of switch transistor $M_{SW}$, and hence the voltage drop across $R_{ON}$. Furthermore, and in contrast to the prior art, the invention provides feedback $V_9$ representative of the magnitude of the inductor current $I_L$ to start up circuitry 4-3 prior to activation of the error amplifier A1 formed by transistors M4 and M3. This speeds up the start up operation, avoids overloading of inductor L and/or switch transistor $M_{SW}$ with too much current and thus improves the reliability of inductor L and/or switch transistor $M_{SW}$, and also improves energy efficiency of the start up operation.

It should be appreciated that the conventional expedient of using non-overlapping clock signals (not shown) can be employed to prevent or reduce shoot-through currents in the CMOS circuitry to further improve energy efficiency.

Figure 6:
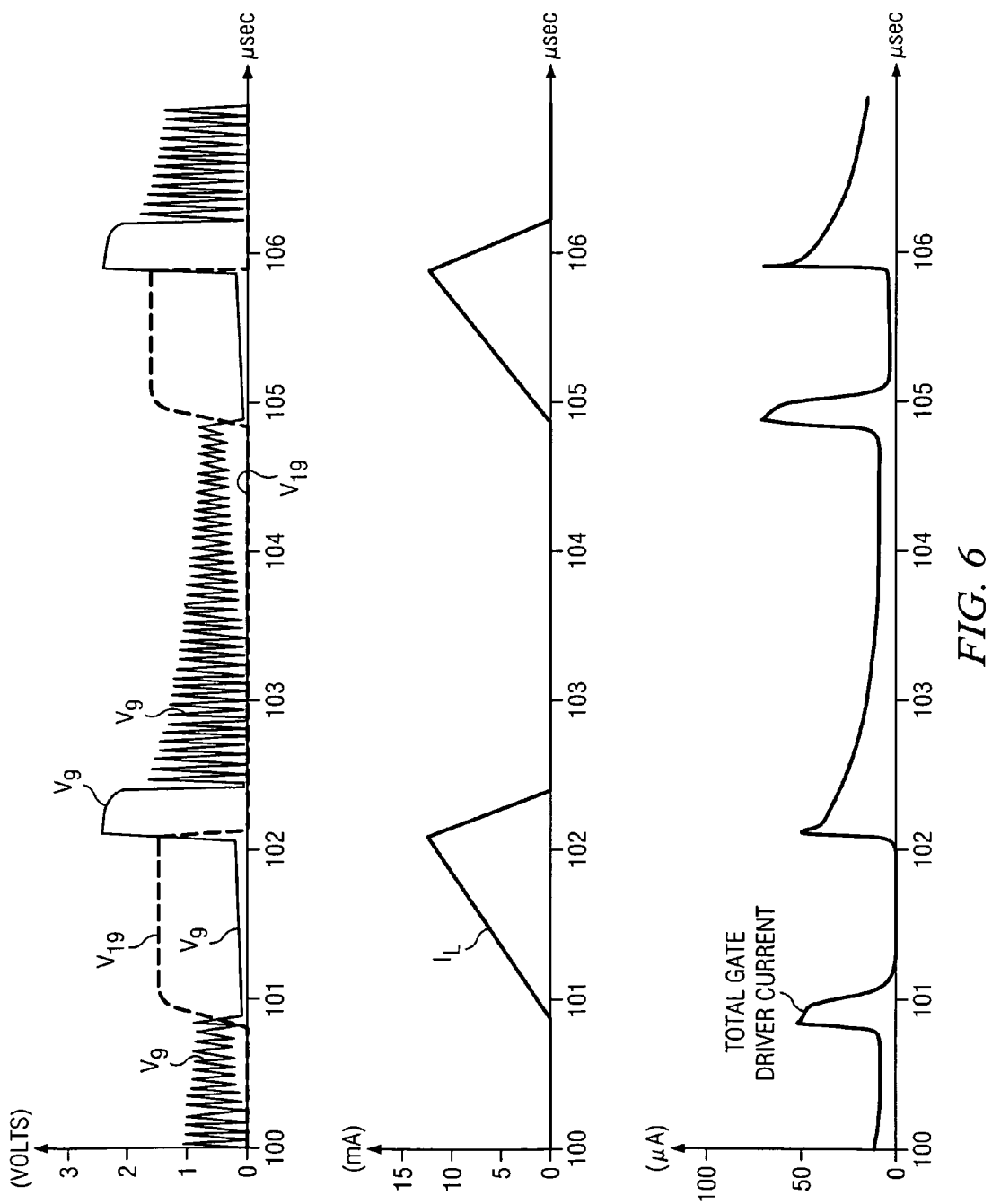
FIGS. 6 and 7 are timing diagrams useful in explaining the operation of the circuit of FIGS. 4 and 5.

FIG. 6 shows simulated waveforms for the circuit of FIG. 5 for the case when both $V_{IN}$ and $V_{DD}$ are equal to 0.5 volts. In FIG. 6, the $V_{19}$ waveform represents the gate voltage of switch transistor $M_{SW}$, and the $V_9$ waveform represents the voltage at the drain of switch transistor $M_{SW}$. The middle waveform in FIG. 6 represents the inductor current $I_L$. The simulated bottom waveform represents the total current consumption of gate driver circuit 5. The $V_9$ waveform begins to increase when switch transistor $M_{SW}$ is initially turned on in response to $V_{19}$. The $I_L$ waveform then starts to increase. At some point, the drain voltage $V_9$ of switch transistor $M_{SW}$ reaches the above mentioned threshold of 100 to 200 millivolts, and at that moment start up circuitry 4-3 operates to stop charging inductor L (i.e., to stop further increases in $I_L$) by turning off switch transistor $M_{SW}$. This causes the drain voltage waveform $V_9$ to increase sharply. During this time, inductor current $I_L$ is steered through diode D to the battery (not shown) or load capacitor. Start up circuitry 4-3 then waits until capacitor C1 is charged through resistor R1 to threshold voltage of inverter I1, at which time the next oscillation cycle begins.

Figure 7:
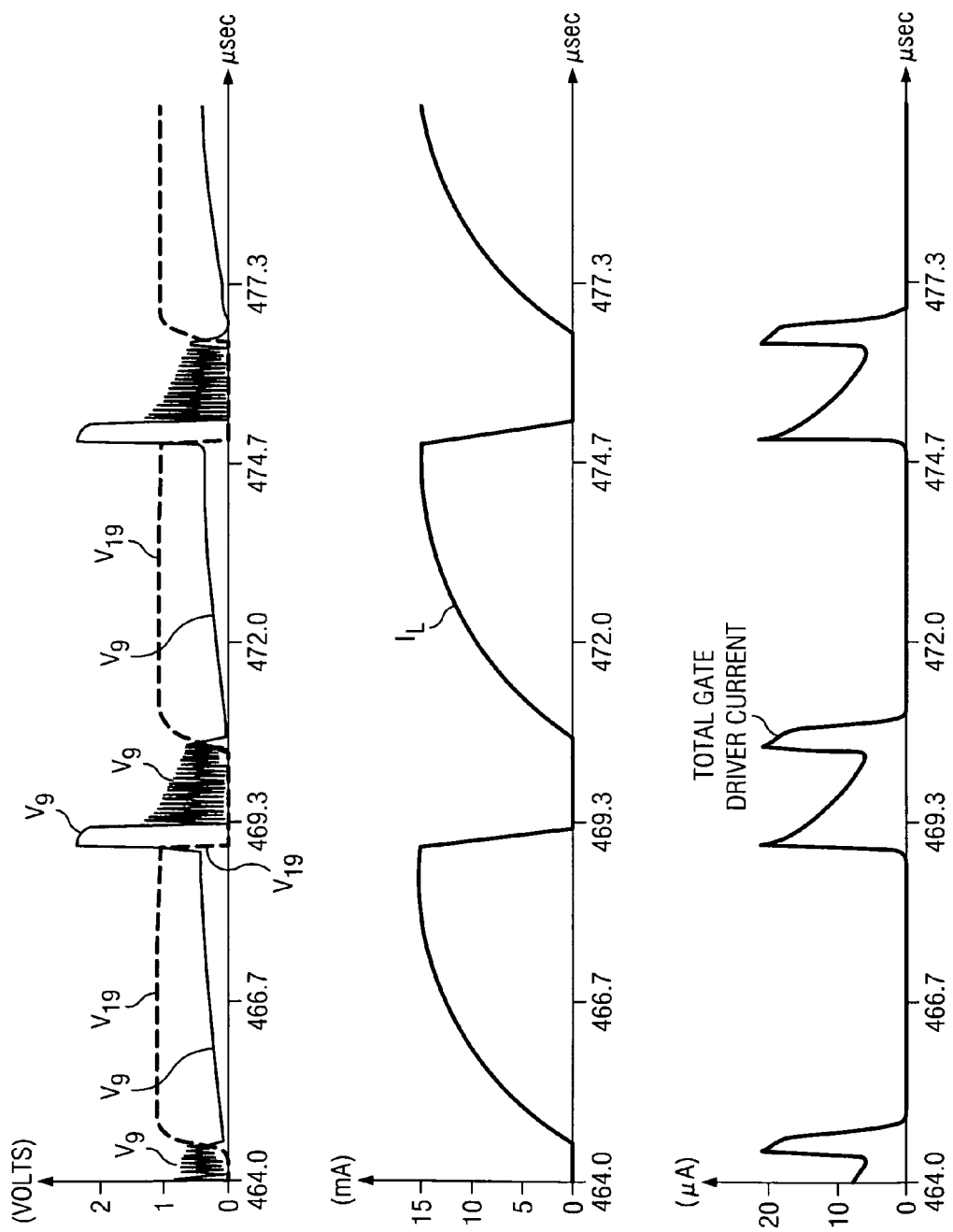

The simulated waveforms shown in FIG. 7 are somewhat similar to those in FIG. 6, for the case in which both $V_{DD}$ and $V_{IN}$ are equal to 0.4 volts. It can be seen from the $V_9$ waveform of FIG. 7 that the current integration takes much longer than in FIG. 6, resulting in a total value of the duty cycle for FIG. 7 that is much higher, and hence the amount of energy delivered to the battery in the case of FIG. 7 is much smaller than for the case shown by FIG. 6. This is because the inductor L saturates in the case shown in FIG. 7, as indicated by the $I_L$ waveform.

The invention provides a simple, very low cost way of increasing the reliability and efficiency of the boost converter or battery charger start up circuit. The described embodiments of the invention include the combination of the oscillator with the switch transistor, inductor, and diode of a boost converter, and provide additional negative feedback that decreases the duty cycle of the switch transistor $M_{SW}$ when the switch current, and hence also the inductor current $I_L$ reaches a predetermined threshold value. However, the start up circuitry could be in conjunction with start up of circuits other than boost converters.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention. Although the described embodiments of the invention provide start up circuitry which operates from very low voltage, low-frequency AC input signals applied to a boost converter, the start up circuitry could be operated in conjunction with any circuit that needs to start up from a very low (e.g. 400 millivolt) input signal.

What is claimed is:

1. A start up circuit for assisting start up of an inductive boost circuit including a switch transistor coupled to the inductor rises to a predetermined input voltage level, the boost circuit generating a first voltage indicative of a current flowing in the inductor, the start up circuit comprising:
   (a) oscillator circuitry including
      1) delay circuitry having an input coupled to a first conductor and an output coupled to a second conductor,
      2) the second conductor being coupled to a first terminal of a first capacitor, a second terminal of the first capacitor being coupled by the second conductor to a first terminal of a first resistor, a first terminal of a second resistor, and a first terminal of a second capacitor, the first resistor having a second terminal coupled to a drain of a first transistor, the second resistor having a second terminal coupled to a drain of a second transistor, the first transistor having a source coupled to a first supply voltage and a gate coupled to the first terminal of the first capacitor, values of the first and second resistors and values of the first and second capacitors being determinative of a duty cycle of the oscillator circuitry, the second transistor having a source coupled to a second supply voltage and a gate coupled to the gate of the first transistor; and
   (b) amplifier circuitry having a first input coupled to receive the first voltage and also having an output coupled to turn off the switch transistor if the first voltage exceeds a predetermined level to prevent the inductor current from exceeding a predetermined inductor current level.

2. The start up circuit of claim 1 including a gate driver circuit having an input coupled to the second conductor and an output coupled to a gate of the switch transistor.

3. The start up circuit of claim 2 wherein the gates of the first and second transistors are directly coupled to the second conductor.

4. The start up circuit of claim 2 wherein the delay circuitry includes a first inverter having an input coupled to the first conductor and an output coupled to an input of a second inverter having an output coupled to the second conductor.

5. The start up circuit of claim 4 wherein the output of the amplifier circuitry is 2coupled to the first conductor by means of a third transistor having a gate coupled to the output of the amplifier circuitry, a drain coupled to the first conductor, and a source coupled to the first supply voltage by means of a fourth transistor having a gate coupled to the second conductor.

6. The start up circuit of claim 1 wherein the output of the amplifier circuitry is directly coupled to the first conductor.

7. The start up circuit of claim 1 wherein the amplifier circuitry has a second input coupled to receive a reference voltage equal to the predetermined level of the first voltage.

8. The start up circuit of claim 1 wherein the gates of the first and second transistors are coupled to the second conductor by means of an inverting circuit including a third transistor having a gate coupled to the second conductor, a source coupled to the first supply voltage and a drain coupled by a third conductor to the gates of the first and second transistors and a drain of a fourth transistor having a gate coupled to the second conductor and a source coupled to the second supply voltage.

9. The start up circuit of claim 8 wherein the delay circuitry includes a first inverter having an input coupled to the first conductor and an output coupled to an input of a second inverter having an output coupled to an input of a third inverter having an output coupled to the second conductor.

10. The start up circuit of claim 9 wherein the amplifier circuitry includes a fifth transistor having a source coupled to receive the first voltage, a gate and drain coupled to receive a bias current from the first supply voltage and also coupled to a gate of a sixth transistor, the sixth transistor having a source coupled to the second supply voltage and a drain coupled to the first conductor, wherein channel-width-to-channel-length ratios of the fifth and sixth transistors are mismatched to in effect provide a threshold voltage equal to the predetermined level of the first voltage at which the switch transistor is to be turned off.

11. The start up circuit of claim 9 wherein the channel-width-to-channel-length ratio of the fifth transistor is greater than that of the sixth transistor.

12. The start up circuit of claim 10 including a seventh transistor having a source coupled to the second supply voltage, a drain coupled to the gates of the fifth and sixth transistors, and a gate connected to the output of the first inverter to disable the amplifier circuitry while the switch transistor is off.

13. The start up circuit of claim 1 wherein the boost circuit includes a diode having an anode coupled to the drain of the switch transistor and a cathode coupled to an output of the boost converter, for steering the current in the inductor through an output conductor of the boost converter when the switch transistor is off.

14. The start up circuit of claim 1 wherein the input voltage comes from a rectifier circuit of a low voltage energy harvesting system.

15. A method for assisting start up of an inductive boost circuit including a switch transistor having a drain coupled to a first terminal of an inductor having a second terminal coupled to receive an input voltage, the method comprising:
(a) turning on the switch transistor in response to a first phase of a cycle of oscillator circuitry having an adjustable duty cycle, to cause a build-up of the inductor current;
(b) coupling a drain voltage of the switch transistor to a first input of amplifier circuitry to cause a first change in an output of the amplifier circuitry if the drain voltage exceeds a predetermined value corresponding to a maximum desired build-up of the inductor current;
(c) immediately turning off the switch transistor in response to the first change in the output of amplifier circuitry by immediately terminating the first phase of the oscillator circuitry;
(d) steering the built-up inductor current into a load;
(e) operating the oscillator circuitry to complete a normal second phase of the cycle immediately after the terminating of the first phase; and
(f) repeating steps (a) through (e).

16. The method of claim 15 wherein
step (a) includes turning the switch transistor on during a first phase of a cycle of duty-cycle-adjustable oscillator circuitry which includes delay circuitry having an input coupled to a first conductor and an output coupled to a second conductor, the second conductor being coupled to a first terminal of a first capacitor, a second terminal of the first capacitor being coupled by the second conductor to a first terminal of a first resistor, a first terminal of a second resistor, and a first terminal of a second capacitor, the first resistor having a second terminal coupled to a drain of a first transistor, the second resistor having a second terminal coupled to a drain of a second transistor, the first transistor having a source coupled to a first supply voltage and a gate coupled to the first terminal of the first capacitor, values of the first and second resistors and values of the first and second capacitors being determinative of a duty cycle of the duty-cycle-adjustable oscillator circuitry, the second transistor having a source coupled to a second supply voltage and a gate coupled to the gate of the first transistor,
step (c) includes charging the first and second capacitors to a first logic level in response to the first change in the output of the amplifier circuitry, wherein the switch transistor is turned off in response to the first logic level, and
step (e) includes charging the first and second capacitors to a second logic level through one of the first and second resistors, wherein the switch transistor is turned on in response to the second logic level.

17. The method of claim 16 wherein step (a) includes applying an output voltage of the delay circuit to an input of a gate driver circuit, an output of which turns the switch transistor on, and wherein step (c) includes applying another output voltage of the delay circuit to the input of the gate driver circuit, the output of which turns the switch transistor off.

18. The method of claim 15 including providing the input voltage from a low voltage energy harvesting system.

19. The method of claim 15 including providing the oscillator circuitry as a ring oscillator.

20. A start up circuit for assisting start up of an inductive boost circuit including a switch transistor having a drain coupled to a first terminal of an inductor having a second terminal coupled to receive an input voltage, comprising:
(a) means for turning on the switch transistor in response to a first phase of a cycle of oscillator circuitry having an adjustable duty cycle, to cause a build-up of the inductor current;
(b) means for coupling a drain voltage of the switch transistor to an input of amplifier circuitry to cause a first change in an output of the amplifier circuitry if the drain voltage exceeds a predetermined value corresponding to a maximum desired build-up of the inductor current;

(c) means for immediately turning off the switch transistor in response to the first change in the output of amplifier circuitry by immediately terminating the first phase;
(d) means for steering the built-up inductor current into a load; and
(e) means for operating the oscillator circuitry to complete a normal second phase of the cycle immediately after the terminating of the first phase.

* * * * *